United States Patent
Livne et al.

(10) Patent No.: US 9,804,800 B2
(45) Date of Patent: Oct. 31, 2017

(54) DETECTING HEAP-SPRAY IN MEMORY IMAGES

(71) Applicant: Palo Alto Networks, Inc., Santa Clara, CA (US)

(72) Inventors: Alon Livne, Tel Aviv-Yafo (IL); Shlomi Levin, Tel Aviv-Yafo (IL); Gal Diskin, Tel Aviv-Yafo (IL)

(73) Assignee: PALO ALTO NETWORKS, INC., Santa Clara, CA (US)

( * ) Notice: Subject to any disclaimer, the term of this patent is extended or adjusted under 35 U.S.C. 154(b) by 217 days.

(21) Appl. No.: 14/753,057

(22) Filed: Jun. 29, 2015

(65) Prior Publication Data

US 2016/0378986 A1 Dec. 29, 2016

(51) Int. Cl.
G06F 21/56 (2013.01)
G06F 3/06 (2006.01)
G06F 21/52 (2013.01)

(52) U.S. Cl.
CPC ............ G06F 3/0673 (2013.01); G06F 3/064 (2013.01); G06F 3/0622 (2013.01); G06F 21/52 (2013.01); G06F 2221/033 (2013.01)

(58) Field of Classification Search
None
See application file for complete search history.

(56) References Cited

U.S. PATENT DOCUMENTS

| | | | |
|---|---|---|---|
| 8,307,435 B1 | 11/2012 | Mann et al. | |
| 8,997,219 B2 | 3/2015 | Staniford et al. | |
| 9,015,834 B2 | 4/2015 | Salamat et al. | |
| 9,202,054 B1* | 12/2015 | Lu | G06F 21/566 |
| 2008/0016305 A1 | 1/2008 | Chen et al. | |
| 2008/0052468 A1* | 2/2008 | Speirs | G06F 13/4059 |
| | | | 711/132 |
| 2009/0300764 A1 | 12/2009 | Freeman | |
| 2010/0125913 A1 | 5/2010 | Davenport et al. | |
| 2010/0205674 A1* | 8/2010 | Zorn | G06F 21/556 |
| | | | 726/25 |
| 2012/0144486 A1* | 6/2012 | Navaraj | G06F 21/52 |
| | | | 726/23 |
| 2012/0216280 A1 | 8/2012 | Zorn et al. | |
| 2012/0222116 A1 | 8/2012 | Chenette | |

(Continued)

FOREIGN PATENT DOCUMENTS

CN 103984898 * 8/2014

OTHER PUBLICATIONS

Corelean Team, "Exploit writing tutorial part 11", 12/11, found at https://www.corelan.be/index.php/2011/12/31/exploit-writing-tutorial-part-11-heap-spraying-demystified.*

(Continued)

Primary Examiner — Peter Poltorak
(74) Attorney, Agent, or Firm — D.Kligler IP Services Ltd.

(57) ABSTRACT

A computer is protected from heap spray attacks by identifying blocks in a heap memory, associating the blocks in buckets according to the block sizes, selecting one of the buckets, and choosing a first block and a second block from the selected bucket. The method is further carried out by making a content comparison of the first block with the second block, accumulating a positive result when the comparison meets a predetermined criterion of similarity, and reporting a heap spray detection when accumulated positive results exceed a predetermined threshold.

19 Claims, 7 Drawing Sheets

(56) References Cited

U.S. PATENT DOCUMENTS

| | | | |
|---|---|---|---|
| 2013/0152200 A1* | 6/2013 | Alme | H04L 63/145 726/24 |
| 2016/0004861 A1* | 1/2016 | Momot | G06F 21/552 726/23 |
| 2016/0147997 A1* | 5/2016 | Dover | G06F 21/575 713/2 |

OTHER PUBLICATIONS

Le et al. "Detecting Heap-Spray Attacks in Drive-by Downloads: Giving Attackers a Hand", 38$^{th}$ Annual IEEE Conference on Local Computer Networks, 978-1-4799-0537-9/13, 9/13.*
LeMaters, "Heap Spray Detection with Heap Inspector", Blackhat USA 2011, 8/11.*
U.S. Appl. No. 14/035,970, Office Action dated Mar. 7, 2016.
Youtube—"Hardening Windows Processes", 1 pages, Published on line Aug. 5, 2012.
Badishi et al., U.S. Appl. No. 14/035,970, dated Sep. 25, 2013.
Roemer et al., "Return-Oriented Programming: Systems, Languages, and Applications", ACM Transactions on Information and System Security (TISSEC) ,vol. 15, No. 1, 42 pages, Mar. 2, 2012.
U.S. Appl. No. 14/035,970, Office Action dated Jun. 19, 2015.
Qu et al., U.S. Appl. No. 13/951,316, filed Jul. 25, 2013.

* cited by examiner

DETECTING HEAP-SPRAY IN MEMORY IMAGES

BACKGROUND OF THE INVENTION

1. Field of the Invention

This invention relates to electronic data processing. More particularly, this invention relates to security arrangements for protecting computers or computer systems against unauthorized activity.

2. Description of the Related Art

The meanings of certain acronyms and abbreviations used herein are given in Table 1.

TABLE 1

Acronyms and Abbreviations

| | |
|---|---|
| ASLR | Address Space Layout Randomization |
| CPU | Central Processing Unit |
| DEP | Data Execution Prevention |
| I/O | Input/Output |
| NLS | National Language Support |
| NOP | No Operation |

Memory corruption has been a consistently prevalent attack vector against various programs throughout software history. For example, computer instructions may be injected into a computer's memory that may either execute directly as malware, or may direct the processor to malware installed elsewhere. Such mechanisms include stack overflow or buffer overflow.

In response there has been progression of the security landscape. Various mitigations and protections such as address space layout randomization (ASLR) and data execution prevention (DEP) have been incorporated into the execution environment. Exploitation of vulnerabilities via memory corruption has in turn become a more contrived process, usually requiring several stages of preparation and execution in each attack, before execution can be diverted.

The heap, a portion of memory used for dynamic allocation, is common to many computer architectures and is used widely by operation systems and application programs. Heap management routines do not operate in a predefined order in contrast to stack management. Consequently, it is very difficult to maintain awareness of the state of the heap. The lack of an enforced heap management pattern constitutes a significant security vulnerability. Indeed, when the memory is randomized as in ASLR, identification of intrusive code in the heap becomes even more difficult.

A technique known as "heap spraying" exploits the vulnerability, and may be found in one or more stages leading to execution of unauthorized computer software. Essentially the technique involves distributing multiple copies of malicious code in the heap, typically in a random fashion. Heap spraying is a multi-purpose tool—it can be used to reduce entropy within a process memory space in order to limit the effectiveness of ASLR. It can be used to assume control of freed memory blocks as part of use-after-free vulnerabilities, and it can be used to distribute a payload within the memory space to increase the likelihood that the payload will become operational.

There have been a number of attempts to deal with heap spraying: U.S. Patent Application Publication No. 2010/0205674 proposes determining a vulnerability statistic by identifying potential sleds (series of NOP instructions) within the memory, and creating a statistic that is a ratio of the amount of potential sleds per the total memory. When the vulnerability statistic rises above a certain level, the system may alert a user or administrator to a high vulnerability condition.

U.S. Patent Application Publication No. 2012/0144486 describes detection of a heap spray attack when a script is received at an electronic device from a remote device via a network and a loop operation is detected in the script that contains a write operation operable to write data to a memory of the electronic device. The amount of the data operable to be written to the memory by the write operation is determined and the data is prevented from being written to the memory if the aggregate size of multiple copies of the data is greater than or equal to a threshold.

U.S. Patent Application Publication No. 2012/0222116 proposes installing a detection module into a web browser. The detection module patches or hooks all calls to the detection module in order to identify calls indicating a heap corruption exploit. The identified calls are then analyzed to determine whether a heap corruption exploit is occurring.

SUMMARY OF THE INVENTION

According to disclosed embodiments of the invention, a memory image of a process is analyzed, and it is determined whether or not heap spraying has been performed in the process to which the memory image belongs. This determination is performed passively, without interfering or modifying the process memory in any way, making it suitable for live in-process detection as well as for off-line analysis. The input is in the form of memory blocks, which independently comprise data blocks of a certain size. Accordingly, the input is generic in nature, and hence easily portable between operating systems, all of which share a basic memory structure. Moreover, the input can be generated from any memory image, be it a currently running process or a preserved memory dump.

The detection mechanism is implemented by checking for the existence of patterns within the memory image. It does not seek specific patterns, but merely for the existence of any repeated pattern. As such, it does not merely protect against a specific set of heap sprays; rather it protects against all types of heap sprays by targeting the basic nature of heap sprays—the reduction of memory entropy by creating many blocks of similar size and content. There is no reliance on the sprayed content, which varies from program to program, operating system to operating system, and even with time as new mitigations develop on one hand and new exploitation techniques on the other.

There is provided according to embodiments of the invention a method for protecting a computer, which is carried out by identifying blocks in a heap memory, associating the blocks in buckets according to the block sizes, selecting one of the buckets, and choosing a first block and a second block from the selected bucket. The method is further carried out by making a content comparison of the first block with the second block, accumulating a positive result when the comparison meets a predetermined criterion of similarity, and reporting a heap spray detection when the accumulated positive results in repeated performances of selecting, choosing, making a comparison and accumulating exceed a predetermined threshold.

According to one aspect of the method, selecting one of the buckets is performed only for buckets wherein the sizes of the blocks exceed a predetermined size value.

According to an additional aspect of the method, the predetermined size value is 0x10000 bytes.

In another aspect of the method choosing a first block and a second block from the selected bucket is performed iteratively.

In a further aspect of the method choosing a first block and a second block from the selected bucket is iterated a predetermined number of times.

According to yet another aspect of the method, making a content comparison includes identifying common subsets of bytes, wherein the subsets comprise sequences of bytes having identical values and identical offsets in the first block and the second block, selecting a third block from the selected bucket, making a determination whether at least a portion of the common subsets are also in common with the third block, and accumulating a positive result responsively to a positive determination.

According to an additional aspect of the method, the third block is selected randomly.

Still another aspect of the method selecting the third block and making a determination are performed up to 50 times.

According to another aspect of the method, making a comparison includes selecting an offset, determining whether a sequence of bytes beginning at the offset and having a predetermined minimum length have equal values in the first block and the second block, and accumulating a positive result responsively to a positive determination.

According to one aspect of the method, the offset is selected randomly.

According to a further aspect of the method, selecting an offset is performed iteratively.

According to yet another aspect of the method, selecting an offset is performed up to 50 times.

Still another aspect of the method determining equal values is performed only when the bytes are not NULL bytes.

There is further provided according to embodiments of the invention a computer software product for protecting a computer, including a non-transitory computer-readable storage medium in which computer program instructions are stored, which instructions, when executed by a computer, cause the computer to identify blocks in a heap memory, associate the blocks in buckets according to the block sizes, select one of the buckets, and choose a first block and a second block from the selected bucket. The computer is further instructed to make a content comparison of the first block with the second block, accumulate a positive result when the comparison meets a predetermined criterion of similarity, and report a heap spray detection when the accumulated positive results in repeated performances of selecting, choosing, making a comparison and accumulating exceed a predetermined threshold.

There is further provided according to embodiments of the invention a data processing system, including a processor, and a memory accessible to the processor storing programs and data objects therein. The memory includes a heap memory. The programs include a detection module and an alert module, wherein an invocation of the detection module causes the processor to identify blocks in the heap memory, associate the blocks in buckets according to the block sizes, select one of the buckets, and choose a first block and a second block from the selected bucket. The computer is further instructed to make a content comparison of the first block with the second block, accumulate a positive result when the comparison meets a predetermined criterion of similarity, and invoke the alert module to report a heap spray detection when the accumulated positive results in repeated performances of selecting, choosing, making a comparison and accumulating exceed a predetermined threshold.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION in the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Process steps are described herein in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement a method.

Definitions

A "bucket" is an unordered set of data. In this disclosure buckets are populated by references to memory areas having respective common sizes or size ranges. In this disclosure the buckets are not limited in capacity A "memory block" refers to areas of physical, logical or virtual memory of a computing device, and more particularly to heap memory objects. The memory blocks discussed herein are variable in size and may be aligned on boundaries according to the operating system being used.

Overview.

Figure 1:
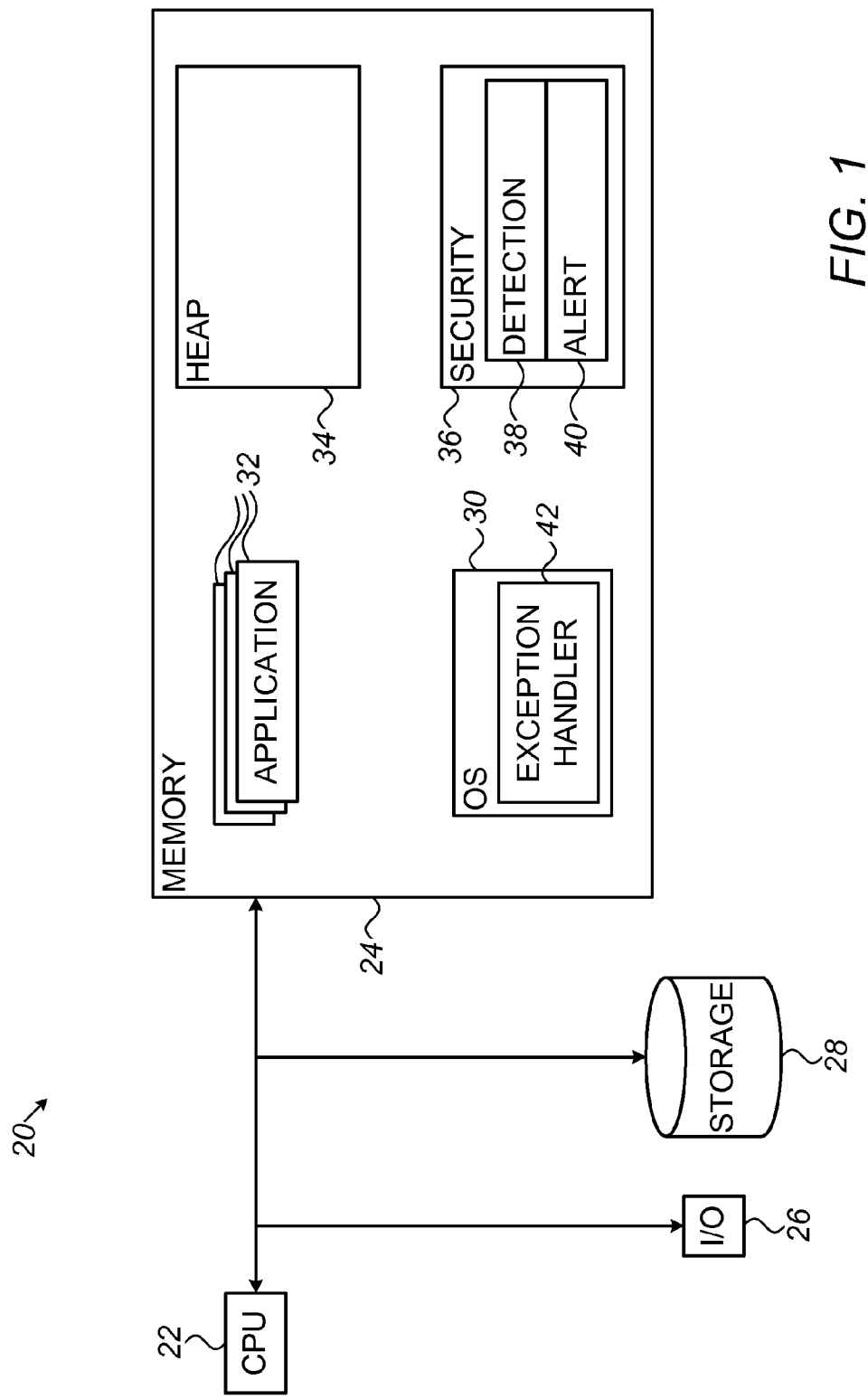
FIG. 1 is a block diagram that schematically illustrates elements of a computing apparatus in accordance with an embodiment of the invention.

Turning now to the drawings, reference is initially made to FIG. 1, which is a block diagram that schematically illustrates elements of a computer 20 (also referred to as "computing apparatus"), in accordance with an embodiment of the present invention. A central processing unit (CPU 22) reads and writes program components and data from and to a memory 24. Memory 24 typically comprises random-access memory. Computer 20 may also comprise input/output (I/O) devices 26, such as a network interface controller and user interface elements, and non-volatile storage memory 28, as well as other peripheral components (not shown).

CPU 22 typically comprises a general-purpose, programmable processor, which runs various programs using program instructions and data structures that are held in memory 24. These programs include an operating system 30 and application processes 32, which typically allocate and make use of memory in the address range of a heap 34. Although heap 34 is shown here, for the sake of convenience, as a monolithic block, in general the heap is defined in terms of a range or ranges of virtual memory addresses, which are allocated to each process 32 individually.

In conjunction with these processes, CPU 22 runs security program modules 36, in order to detect and inhibit unauthorized access to resources of computer 20 by malicious code that may be injected into memory 24 by an attacker. Security program modules 36 contain software, in the form of computer-readable program instructions, which may be downloaded to computer 20 in electronic form, over a network, for example. Additionally or alternatively, the software may be provided and/or stored on tangible, non-transitory computer-readable media, such as optical, magnetic, or electronic memory media.

In an embodiment of the present invention, security modules 36 include a detection module 38 and an alert module 40. Alert module 40 is invoked when suspicious activity, such as a possible heap-spray attack, is detected while the computer is running. In some embodiments, alert module 40 is invoked by or integrated with an exception handler function 42 of operating system 30. The operation of detection module 38 and alert module 40 is described in greater detail hereinbelow. Typically, these modules operate in conjunction with other sorts of security program modules, as are known in the art, but these additional security functions are beyond the scope of the present description.

Figure 2:
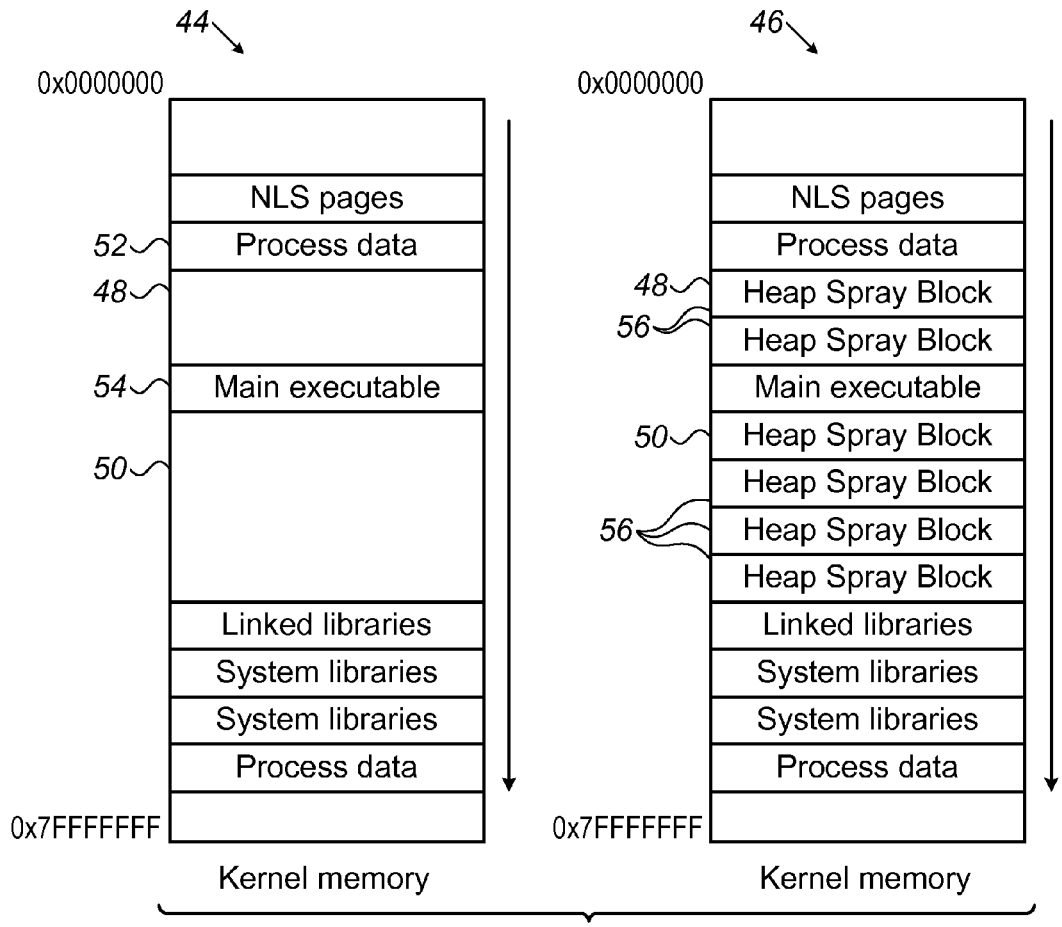
FIG. 2 shows two memory layout diagrams that are relevant to an embodiment of the invention.

Reference is now made to FIG. 2, which shows memory layout diagrams 44, 46, which relate to an implementation of an embodiment of the invention. The diagrams 44, 46 are illustrative of a 32-bit Microsoft Windows® environment, but are applicable, mutatis mutandis, to other architectures, operating systems, and to kernel mode operations. The diagrams 44, 46 show segments for NLS and process data, executables, linked libraries and system libraries. The arrangement of diagrams 44, 46 is representative. In many modern operating systems, the memory layout is typically randomized to some extent. While generalizations can be made regarding the location of, for example, system libraries and modules (they can be said to reside close to the "top" of the memory space), the content and precise details of these memory areas is unpredictable, and consequently—unknown to an attacker.

Diagram 44 has areas 48, 50, which can be allocated for any purpose. As noted above, heap management routines do not readily lend themselves to identifying memory blocks. Area 48 lies between an area 52, allocated to process data and an area 54. Memory in areas 48, 50 could be allocated and deallocated by any number of application level and system processes.

The attacker often needs to include precise addresses as part of his malicious inputs. To satisfy this requirement he may incorporate a heap spray in the attack, utilizing the input mechanisms of vulnerable software, e.g., JavaScript™, ActionScript™, HTML5, media elements, and vector images. Typically the heap spray precedes actual execution of any malware. Because the interfaces used in the heap spray are legitimate and are often used innocently, it is very hard to distinguish and prevent suspicious excessive use or actual malicious use of these interfaces. In diagram 46, the areas 48, 50 are have been populated by heap spray blocks 56.

The effect of a heap spray is to pack the memory space full of the attacker's data, thus vastly increasing the chance that a given fixed, predetermined address will contain predictable data. To clarify, consider the example of an exploit using address 0x0c0c0c0c in an attack, where a vulnerability allows diverting execution to an address via a malicious input. In the memory layout of diagram 44 (FIG. 2) prior to heap spraying, this address in the drawing lies somewhere in the heap area 48, the blank space between area 52 (process data and area 54 (main executable). Its content is unknown to the attacker, and is likely unallocated. By employing a heap spray, the attacker can rely on the memory space becoming more similar to the second figure. In this case, the address 0x0c0c0c0c would almost certainly point to one of the heap spray blocks, the content of which as described are controlled by the attacker.

Figure 3:
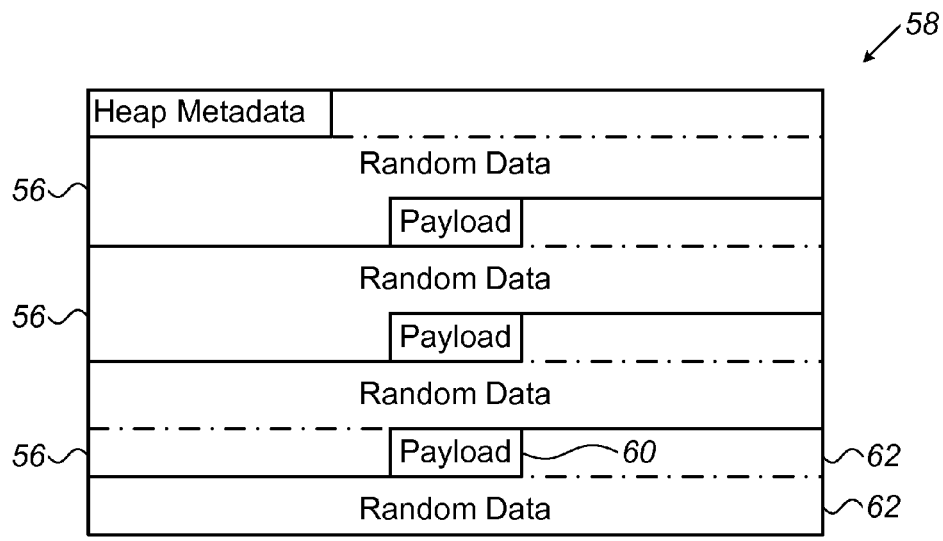
FIG. 3 is a block diagram illustrating the structure of the heap spray blocks 56 in accordance with an embodiment of the invention.

Reference is now made to FIG. 3, which is a block diagram 58 illustrating the structure of the heap spray blocks 56 in accordance with an embodiment of the invention. Three identical heap spray blocks 56 are shown, it being understood that a heap spray area may comprise any number of heap spray blocks 56. The heap spray blocks 56 comprise payload 60 and random data 62.

The heap spray blocks 56 usually contain a large amount of data, only part of which is the payload 60. To clarify—depending of the level of precision provided by the vulnerability, great parts of the heap spray blocks 56 will be inconsequential to the attack, and often contain random data. This random data can vary among heap spray blocks, or can be identical. In some attacks, the random data will be replaced with data that is vital to the attack. What stems from this is that in all cases and variants, some information (i.e., the payload), usually at fixed offsets within the blocks, is exactly the same from block to block. This is a defining factor of heap spraying, for it could not work otherwise. The heap spray is used to plant known data (payload 60) in specific memory block addresses, without any knowledge of the starting offset of these plants or the overall layout of memory in the attacked process.

First Embodiment

Figure 4:
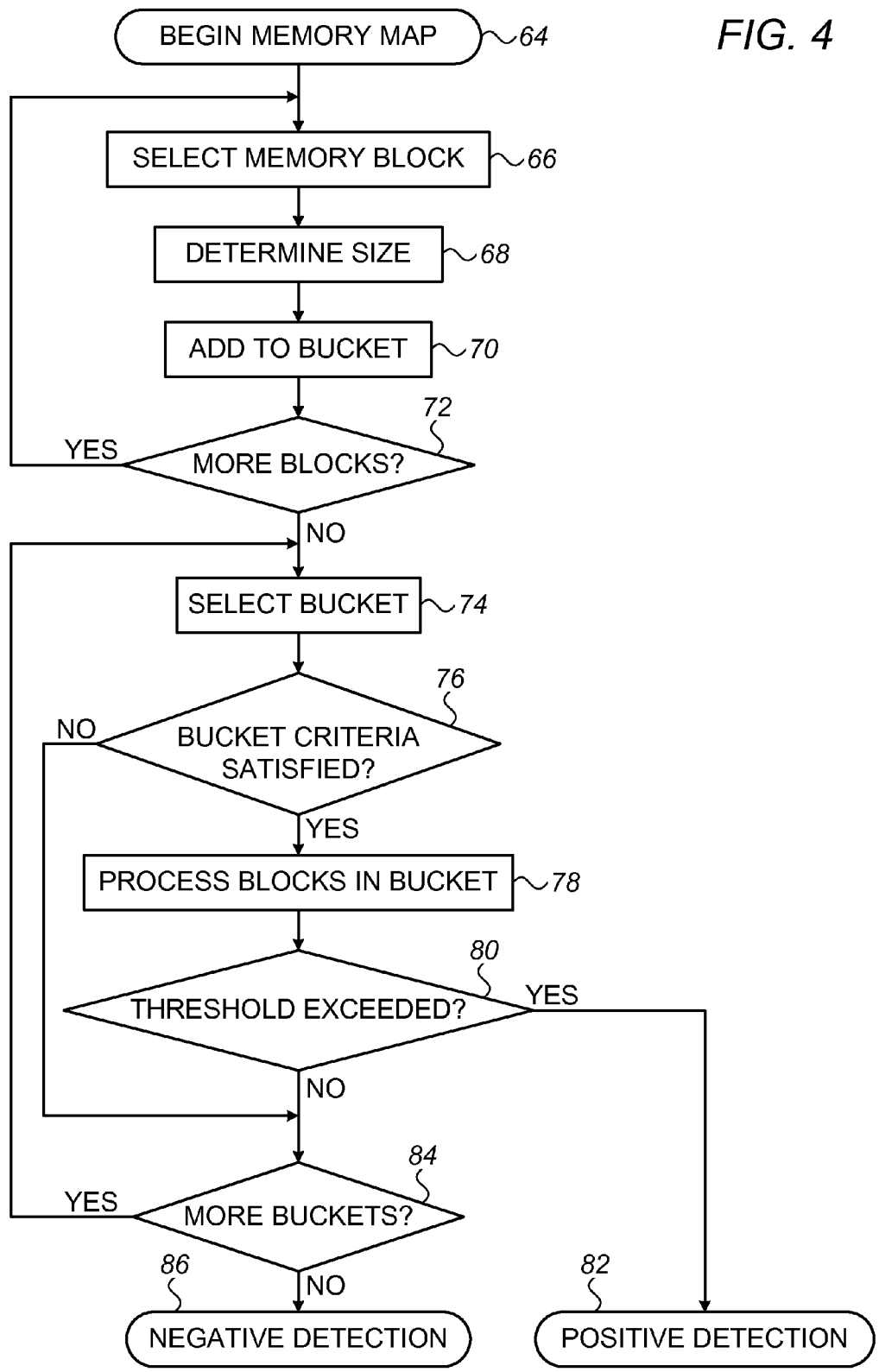
FIG. 4 is a flow chart of a method of heap spray detection in accordance with an embodiment of the invention.

One embodiment of the invention targets the underlying nature of the heap spray in order to achieve optimal detection of the attack. Reference is now made to FIG. 4, which is a flow chart of a method of heap spray detection, in accordance with an embodiment of the invention.

At initial step 64 a mapping of memory begins. All memory blocks are currently mapped. Alternatively, the mapping may be optimized by excluding areas that can be positively identified as not belonging to the heap.

At step 66 a memory block is chosen. Typically the first performance of step 66 involves a memory block at the beginning of the memory space; however this is not essential. The memory blocks could be examined in any convenient order.

Next, at step 68 the size of the current memory block is established. The details of this step may vary according to the computer architecture or the operating system. For example, in the Windows operating system, block size may be obtained by a call to the method VirtualQuery. In Linux, the information can be obtained from the relevant/proc/{pid}/maps file.

Next, at step 70, the current memory block is admitted into a list of all identically sized blocks, i.e., a bucket.

Next, at decision step 72, it is determined if more blocks need to be evaluated. If the determination is affirmative, then control returns to step 66.

If the determination at decision step 72 is negative, then a collection of buckets has been accumulated. Each bucket contains the addresses of all blocks of a certain identical size. For example, the bucket for size N contains addresses of all the allocated memory blocks of size N.

Control now proceeds to step 74. A bucket is selected.

Next, at decision step 76, it is determined if the following criteria are satisfied: the block size of blocks stored in the current bucket exceeds a size threshold. The size threshold is user configurable, and can be parameterized in a practical implementation. A suitable configuration is 0x10000 bytes. Moreover, the number of blocks populating the current bucket must exceed a quantitative threshold. The quantitative threshold is user-configurable. A value of 50 is used in one embodiment.

If the determination is at decision step 76 is negative, then control proceeds to decision step 84, which is described below.

If the determination at decision step 76 is affirmative then control proceeds to a block processing step 78. The blocks in the current bucket are evaluated to determine whether they are the result of heap spraying. Matching blocks are identified and accumulated in step 78. The details of step 78 are presented in FIG. 5 and FIG. 7, which are described below.

After performing step 78, at decision step 80 it is determined whether the number of identical blocks identified in step 78 exceed a predetermined threshold. In a current embodiment this threshold is set at 70 percent of the blocks tested.

If the determination at decision step 80 is affirmative, then a positive detection result is reported in final step 82.

If the determination at decision step 80 is negative, or if the determination at decision step 76 was negative, then at decision step 84 it is determined if more buckets remain to be processed. If the determination at decision step 84 is affirmative, then control returns to step 74 to iterate the bucket analysis procedure with another bucket.

If the determination at decision step 84 is negative, then a negative detection result is reported in final step 86.

Figure 5:
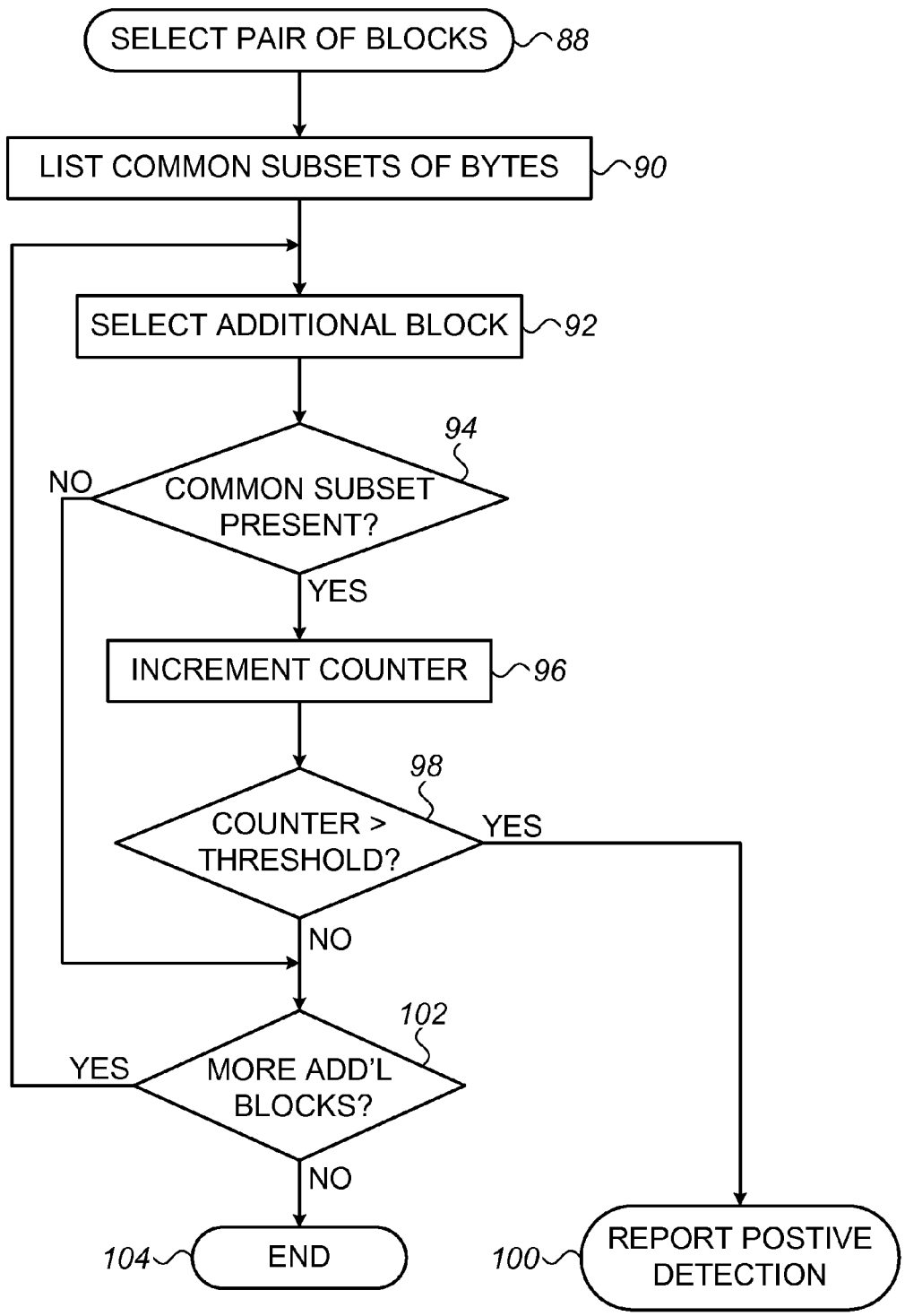
FIG. 5 is a flow chart describing details of the method shown in FIG. 4 in accordance with an embodiment of the invention.

Reference is now made to FIG. 5, which is a flow chart describing the particulars of step 78 (FIG. 4) in accordance with an embodiment of the invention. It will be recalled that step 78 is performed on a qualifying bucket. At initial step 88 a pair of blocks from the bucket is selected at random. In bucket assigned to a size N, these blocks are N-byte size areas of memory.

Next, at step 90 a list of common subsets of bytes in the selected pair of blocks, the common subsets comprising a sequence of bytes having the same values and offsets in both members of the selected pair. This is performed by a byte-by-byte comparison with a fixed index. The output of this action is a list of all common subsets: i.e., runs of bytes at common offsets within the two blocks that contain identical data. Subsets containing insignificant data (for example, NULL bytes) are ignored for this purpose. Other whitelisted data of known composition may be considered insignificant for this purpose.

A simplified example of common subsets of bytes is shown in Table 2, in which each row represents the byte content of a member of a pair of blocks. Each block comprises 10 bytes. Indexing the bytes from the first position (Byte 0) in step 90 would generate two common subsets: bytes 1-2 (values 4, 4); and bytes 5-7 (values 3, 8, 5).

TABLE 2

| 9 | 4 | 4 | 0 | 2 | 3 | 8 | 5 | 5 | 5 |
| 6 | 4 | 4 | 6 | 4 | 3 | 8 | 5 | 2 | 1 |

The common subset list constitutes a pattern in which each common subset comprises a sequence of bytes having a minimum length. While short runs of common data are shown in Table 2 for purposes of explication, in practice a larger user-configured minimum size is required. Currently, a common subset must be a sequence of at least 48 bytes for use in testing other blocks from the currently selected pair. A user-configurable number (currently 40) of additional blocks from the current bucket are tested against the common pair. At step 92 an additional block is selected.

Figure 6:
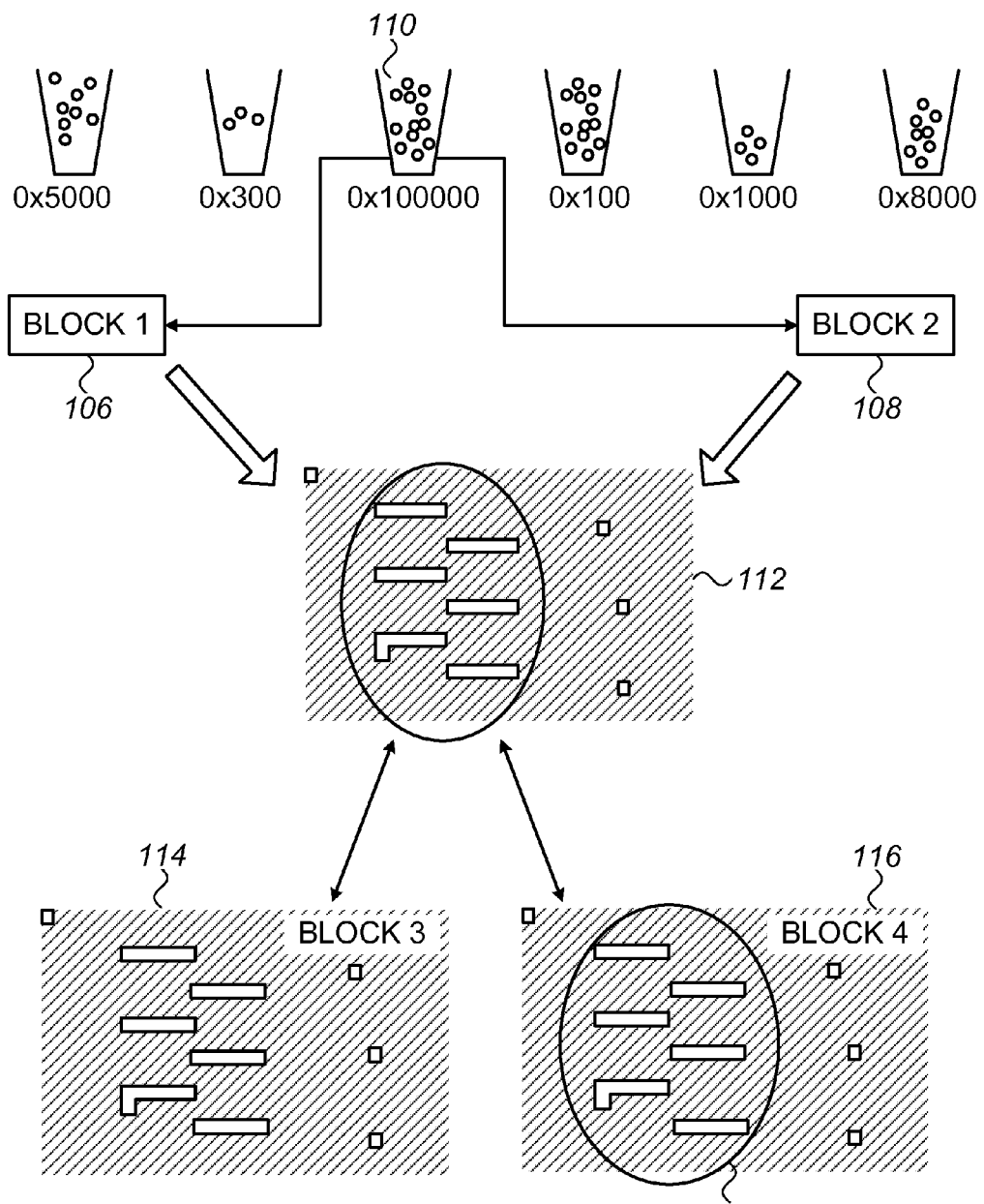
FIG. 6 is a composite diagram illustrating the scheme of FIG. 4 and FIG. 5, in accordance with an embodiment of the invention.

Next, at decision step 94, it is determined if the common subsets found in step 90 are also present in the current additional block. The comparison can be made efficiently by preparing a map of the common subset of bytes (see subset 112; FIG. 6). The data at the offsets and the run length in the current additional block is compared against one of the two original blocks. If the determination at decision step 94 is affirmative, then control proceeds to step 96. A counter is incremented. The counter indicates the number of blocks having positive detection results.

Next, at decision step 98, it is determined if the value of the counter of step 96 exceeds a threshold. Currently the threshold is set at a finding of identical bytes in 70 percent of the blocks tested. Currently, there are a required number of iterations of step 78 (FIG. 4), which is predetermined. For example, if 40 iterations are chosen, the threshold for the counter in step 96 would be 40*0.7=28. If the determination at decision step 98 is affirmative, then control proceeds to final step 100. It is concluded that a possible heap spray attack has been detected, and the procedure is terminated. It is not necessary to examine more blocks.

If the determination at either decision step 94 or decision step 98 is negative, then at decision step 102 it is determined if more of the additional blocks remain to be tested. If the determination is affirmative, then control returns to step 92.

If the determination at decision step 102 is negative then control proceeds to final step 104. At this point it cannot be concluded that a heap spray attack exists. In any case the information in final steps 100, 104 is dealt with in decision step 80 (FIG. 4).

The procedure of FIG. 5 may be repeated several times (currently 50), the sequence being initialized by different randomly selected block pairs. At least ten repetitions are recommended. Thus, buckets that qualify under decision step 76 (FIG. 4) are repeatedly tested. Moreover, the parameters of the procedure may be modified in order to harden or relax security. It is believed that the values mentioned above are close to optimal for standard work environments. There is considerable play, however, before false positive and false negative ratios are affected.

Reference is now made to FIG. 6, which is a composite diagram illustrating the scheme of FIG. 4 and FIG. 5, in accordance with an embodiment of the invention. A list of buckets, whose contents represent memory blocks having a respective common size, the sizes indicated by legends below the buckets. A pair of blocks 106, 108 are chosen from bucket 110. Bytes that are common to the blocks 106, 108 are represented by subset 112, which forms a pattern that can be matched against additional blocks in the bucket.

In the lower portion of the diagram two additional blocks 114, 116 and compared to one of the pair of blocks 106, 108. Block 114 completely matches the subset 112. A partial match between block 116 and subset 112 is encircled Such incomplete matches are ignored for purposes of determining common subsets.

Second Embodiment

Figure 7:
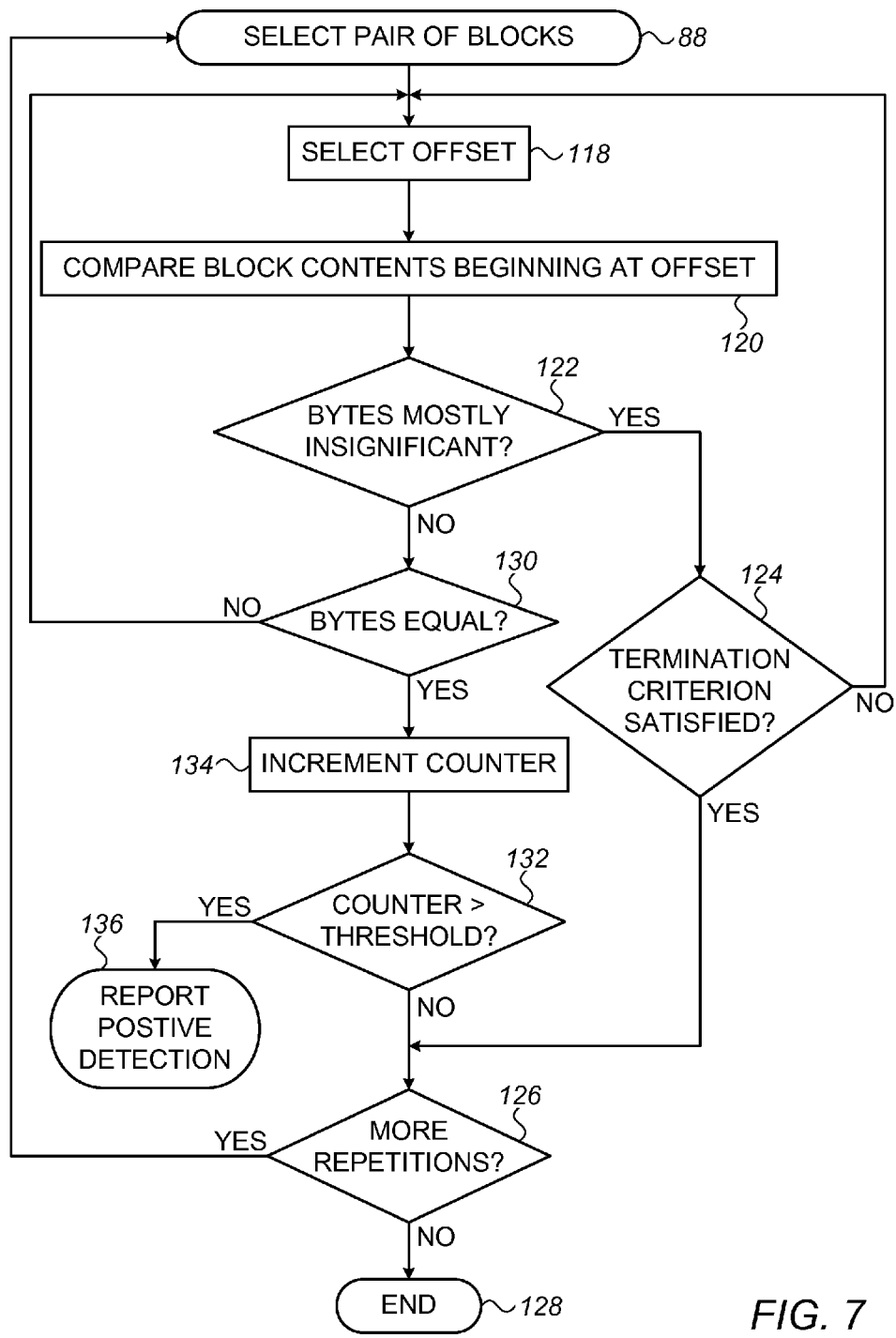
FIG. 7 is a flow chart describing details of the method shown in FIG. 4 in accordance with an alternate embodiment of the invention.

This embodiment is similar to the first embodiment, except that that step 78 (FIG. 4) has a different implementation. Reference is now made to FIG. 7, which is a flow chart describing the particulars of step 78 in accordance with an alternate embodiment of the invention.

Initial step 88 is performed as described above. A pair of blocks from the current bucket are selected at random. The blocks are identical in size.

Next, at step 118 We select a random offset within the two blocks. The offset is applied to both members of the pair.

Next, at step 120 the contents of the pair are compared, beginning at the offset chosen in step 118 and continuing for a comparison interval comprising a predetermined number of bytes (currently 100 bytes).

Next, at decision step 122, it is determined if the bytes in the comparison interval are insignificant, e.g. NULL bytes.

If the determination at decision step 122 is affirmative then control proceeds to decision step 124. In this event, The sequence of steps 118, 120, 122 are repeated until significant bytes are present, or a termination criterion is satisfied. The termination criterion is needed in order to limit iterations in the event the block is mostly comprised of NULL bytes. Suitable criteria include a given number of iterations, or expiration of a time interval. At decision step 124 it is determined whether the termination criterion is satisfied. Alternatively, decision step 124 may be omitted and the method may return directly to step 118.

If the determination at decision step 124 is affirmative then control proceeds to decision step 126. The selection of random pairs of blocks is repeated a predetermined number of times, currently 50 times per bucket. This value may be varied according to the degree of sensitivity of the detection that is desired. At decision step 126 it is determined if more repetitions need to be performed. If so, then control returns to initial step 88. Otherwise control proceeds to final step 128. A significant number of identical bytes in the tested pairs have not been detected.

If at decision step 122 it was determined that the compared bytes were not insignificant, then next, at decision step 130, it is determined if the bytes compared in step 120 are identical.

If the determination at decision step 130 is negative then control returns to step 118 and another offset is chosen for the current pair of blocks.

If the determination at decision step 130 is affirmative then control proceeds to step 96, where a counter is incremented. Then at decision step 132, it is determined if the value of the counter of step 134 exceeds a threshold. Currently the threshold is set at a finding of identical bytes in 70 percent of the blocks tested. If the determination is affirmative, then control proceeds to final step 136. It is concluded that a possible heap spray attack has been detected, and the procedure is terminated. It is not necessary to examine more blocks.

The procedure of FIG. 7 is performed for all buckets, 50 times per bucket as noted above.

Figure 8:
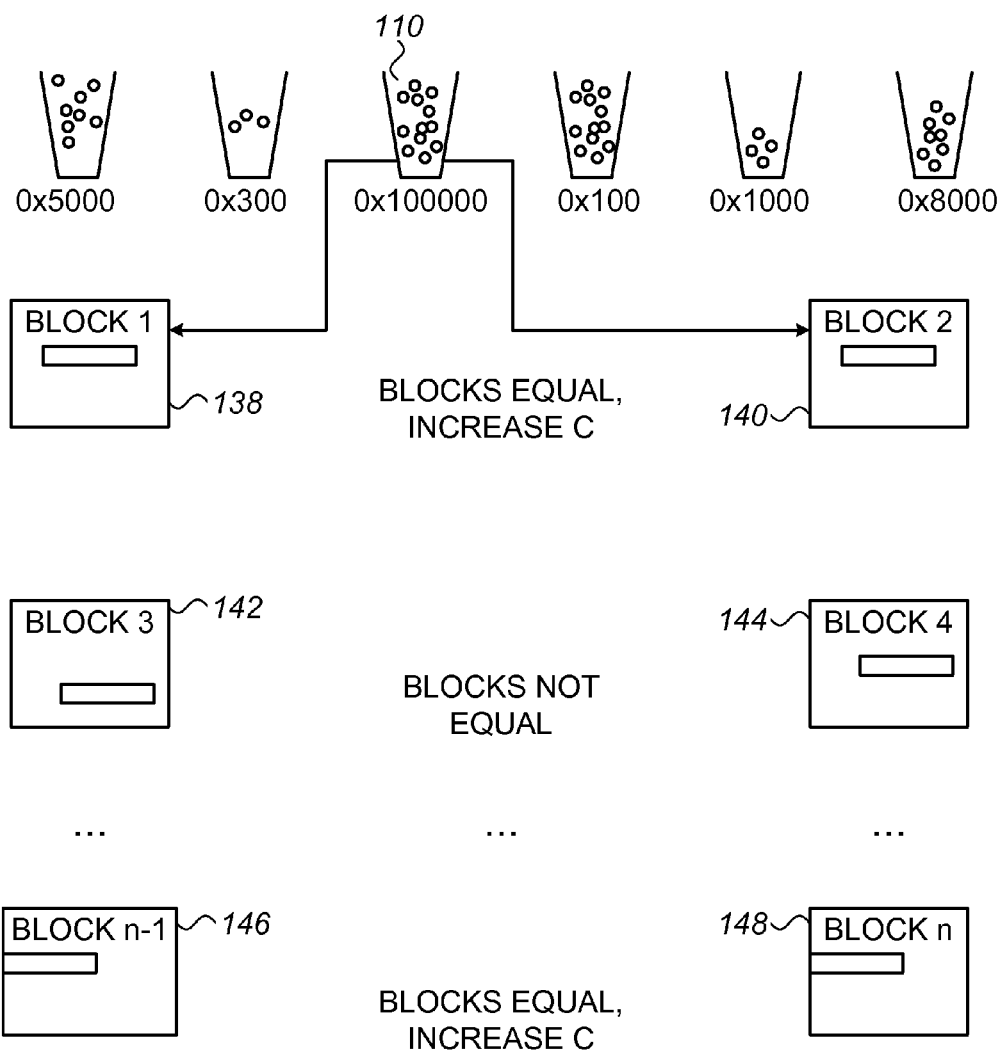
FIG. 8 is a composite diagram illustrating the scheme of FIG. 4 and FIG. 6 in accordance with an alternate embodiment of the invention.

Reference is now made to FIG. 8, which is a composite diagram illustrating the scheme of FIG. 4 and FIG. 6, in accordance with an alternate embodiment of the invention. FIG. 8 is limited to three byte comparisons on a selected pair of blocks for clarity of presentation. After block selection from bucket 110 as described in FIG. 6, byte comparisons at a first selected offset are performed on the selected memory blocks, as shown by comparisons 138, 140. The results indicate equality, and a counter (c) is increased. Byte comparisons at a second selected offset are performed, as shown in comparisons 142, 144. The results fail to indicate equality. The counter is not incremented. Byte comparisons at a third selected offset are performed, as shown in comparisons 146, 148. The results indicate equality, and the counter is incremented.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for protecting a computer, comprising the steps of:
   executing in a computer processor application and system processes that allocate, utilize and deallocate a heap memory;
   while executing the application and system processes, the processor performing the steps of:
   identifying blocks having respective sizes in the heap memory;
   associating the blocks in buckets according to the sizes thereof;
   selecting one of the buckets;
   choosing a first block and a second block from the selected bucket;
   making a content comparison of the first block with the second block;
   accumulating a positive result when the comparison meets a predetermined criterion of similarity; and
   reporting a heap spray detection when the accumulated positive results in repeated performances of the steps of selecting, choosing, making a comparison and accumulating exceed a predetermined threshold.

2. The method according to claim 1, wherein selecting one of the buckets is performed only for buckets wherein the sizes of the blocks exceed a predetermined size value.

3. The method according to claim 2, wherein the predetermined size value is 0x10000 bytes.

4. The method according to claim 1, wherein the step of choosing a first block and a second block from the selected bucket is performed iteratively.

5. The method according to claim 4, wherein the step of choosing a first block and a second block from the selected bucket is iterated a predetermined number of times.

6. The method according to claim 1, wherein making a content comparison comprises:
identifying common subsets of bytes, wherein the subsets comprise sequences of bytes having identical values and identical offsets in the first block and the second block;
selecting a third block from the selected bucket;
making a determination whether at least a portion of the common subsets are also in common with the third block; and
accumulating the positive result responsively to a positive determination.

7. The method according to claim 6, wherein the third block is selected randomly.

8. The method according to claim 6, wherein the steps of selecting the third block and making a determination are performed up to 50 times.

9. The method according to claim 1, wherein making a comparison comprises:
selecting an offset;
determining whether a sequence of bytes beginning at the offset have equal values in the first block and the second block, the sequence having a predetermined minimum length; and
accumulating the positive result responsively to a positive determination.

10. The method according to claim 9, wherein the offset is selected randomly.

11. The method according to claim 9, wherein selecting an offset is performed iteratively.

12. The method according to claim 11, wherein selecting an offset is performed up to 50 times.

13. The method according to claim 9, wherein the step of determining is performed only when the bytes are not NULL bytes.

14. A computer software product for computer protection, including a non-transitory computer-readable storage medium in which computer program instructions are stored, which instructions, when executed by a computer, cause the computer, while the computer is executing application and system processes that allocate, utilize and deallocate a heap memory, to perform the steps of:
identifying blocks having sizes in the heap memory;
associating the blocks in buckets according to the sizes thereof;
selecting one of the buckets;
choosing a first block and a second block from the selected bucket;
making a content comparison of the first block with the second block;
accumulating a positive result when the comparison meets a predetermined criterion of similarity; and
reporting a heap spray detection when the accumulated positive results in repeated performances of the steps of selecting, choosing, making a comparison and accumulating exceed a predetermined threshold.

15. The computer software product according to claim 14, wherein making a content comparison comprises:
identifying common subsets of bytes, wherein the subsets comprise sequences of bytes having identical values and identical offsets in the first block and the second block;
selecting a third block from the selected bucket;
making a determination whether at least a portion of the common subsets are also in common with the third block; and
accumulating the positive result responsively to a positive determination.

16. The computer software product according to claim 14, wherein making a comparison comprises:
selecting an offset;
determining whether a sequence of bytes beginning at the offset have equal values in the first block and the second block, the sequence having a predetermined minimum length; and
accumulating the positive result responsively to a positive determination.

17. A data processing system, comprising:
a processor;
a memory accessible to the processor storing programs and data objects therein, the memory comprising a heap memory, the programs including a detection module and an alert module, wherein an invocation of the detection module causes the processor to perform the steps of:
executing application and system processes that allocate, utilize and deallocate the heap memory;
while executing the application and system processes, the processor:
identifying blocks having sizes in the heap memory;
associating the blocks in buckets according to the sizes thereof;
selecting one of the buckets;
choosing a first block and a second block from the selected bucket;
making a content comparison of the first block with the second block;
accumulating a positive result when the comparison meets a predetermined criterion of similarity; and
invoking the alert module to report a heap spray detection when the accumulated positive results in repeated performances of the steps of selecting, choosing, making a comparison and accumulating exceed a predetermined threshold.

18. The data processing system according to claim 17, wherein making a content comparison comprises:
identifying common subsets of bytes, wherein the subsets comprise sequences of bytes having identical values and identical offsets in the first block and the second block;
selecting a third block from the selected bucket;
making a determination whether at least a portion of the common subsets are also in common with the third block; and
accumulating the positive result responsively to a positive determination.

19. The data processing system according to claim 17, wherein making a comparison comprises:
selecting an offset;
determining whether a sequence of bytes beginning at the offset have equal values in the first block and the second block, the sequence having a predetermined minimum length; and
accumulating the positive result responsively to a positive determination.

* * * * *